US007845833B2

(12) United States Patent
Warnecke

(10) Patent No.: US 7,845,833 B2
(45) Date of Patent: Dec. 7, 2010

(54) LIGHT DIMMER AND ASSOCIATED METHODOLOGY

(75) Inventor: Russell A. Warnecke, Colorado Springs, CO (US)

(73) Assignee: Wybron, Inc., Colorado Springs, CO (US)

( * ) Notice: Subject to any disclaimer, the term of this patent is extended or adjusted under 35 U.S.C. 154(b) by 253 days.

(21) Appl. No.: 12/100,748

(22) Filed: Apr. 10, 2008

(65) Prior Publication Data

US 2008/0253131 A1 Oct. 16, 2008

Related U.S. Application Data

(60) Provisional application No. 60/911,409, filed on Apr. 12, 2007.

(51) Int. Cl.
*F21V 17/02* (2006.01)
*G03B 15/02* (2006.01)

(52) U.S. Cl. .......................... 362/321; 362/325; 362/18

(58) Field of Classification Search ................. 362/321, 362/18, 325
See application file for complete search history.

(56) References Cited

U.S. PATENT DOCUMENTS 1,146,143 A 7/1915 Engers
1,330,766 A 2/1920 Reece
1,460,309 A 6/1923 Bierbrauer
1,550,600 A 8/1925 Wilkie
2,735,929 A 2/1956 Erhardt
3,433,142 A 3/1969 King
4,052,607 A * 10/1977 Larson ........................ 362/18
4,257,086 A 3/1981 Gulliksen
4,800,473 A * 1/1989 Tremblay ................... 362/223
4,972,306 A * 11/1990 Bornhorst ................... 362/278
5,077,649 A * 12/1991 Jackel et al. ................ 362/325
5,590,954 A 1/1997 Hanson et al.
5,724,625 A 3/1998 Dowe
5,733,036 A * 3/1998 Montgomery ............... 362/283
5,975,720 A * 11/1999 Adkins ....................... 362/293
6,102,554 A 8/2000 Willson et al.
6,241,366 B1 6/2001 Roman et al.
6,769,777 B1 8/2004 Dubin et al.
7,338,174 B2 * 3/2008 Koba et al. .................... 353/88

* cited by examiner

*Primary Examiner*—Jong-Suk (James) Lee
*Assistant Examiner*—David J Makiya

(57) ABSTRACT

A light dimming apparatus for dimming light output generated by a light source. A rectangular frame supports sets of blade members at a central aperture defined by the frame. The blade members of a set are positioned side-by-side, and adjacent ones of the blade members are hingedly connected together. Accordion-like movement of the blade members is provided responsive to application of forces applied to the blade members. A component of the applied forces causes linear translation of the blade members in to or out of the central aperture.

20 Claims, 6 Drawing Sheets

LIGHT DIMMER AND ASSOCIATED METHODOLOGY

CROSS-REFERENCE TO RELATED APPLICATIONS

The present application claims the priority of Provisional Patent Application No. 60/911,409, filed on 12 Apr. 2007, the contents of which are incorporated herein by reference.

The present disclosure relates generally to a manner by which to control illumination. More particularly, the present invention relates to light dimming apparatus, and an associated method, by which selectably to dim a light beam.

Blade numbers are translatable into the path of the light beam to partially, or completely, occlude the light beam, thereby to partially, or completely, dim the light beam.

BACKGROUND OF THE INVENTION

Many varied types of lighting devices are available to provide lighting for many different functions. Different lighting functions require, or benefit from, light of particular characteristics. The required, or beneficial, light characteristics are not necessarily static and the light characteristics sometimes need to be altered, such as to increase the intensity of the light or decrease its intensity.

Entertainment lighting, for instance, provides lighting for entertainment activities, such as stage lighting and the like. Entertainment lighting includes a wide array of light-generative devices that generate light energy of many varied characteristics. Light-generative elements are supported at, or form part of, lighting fixtures. Entertainment lighting includes, e.g., incandescent light sources as well as other types of discharge light sources, such as high intensity discharge (HID) or florescent lamps.

Various devices have been developed and are used to control the light output intensity of light generated by the entertainment lighting fixtures, as well as other types of lighting. Additional such devices provide for the balancing or adjusting of light output of multiple lighting fixtures facilitate desired lighting effects at a stage setting, a studio setting, a building, room, or any other location that is to be lighted.

One general manner by which to control the light output of the lighting fixtures is by controlling the electrical signal that feeds the light source. That is to say, the light output of the light fixture is altered by altering the power levels of power provided to power the light source of the lighting fixture. For instance, the light output of an incandescent lamp is controlled by raising and lowering the voltage applied to the lamp, controlling the current applied to the lamp, or by adjusting the wave form of the power that is applied to the lamp. Various of such devices are regularly used. This manner of controlling the light intensity of the light output suffers from the disadvantage that the color temperature and color spectrum of the light output as well as adjusting the output. As an incandescent lamp is dimmed, the light output becomes shifted towards the red frequencies of the light spectrum.

High intensity discharge lamps are also sometimes dimmed by analogous mechanisms. However, high intensity discharge lamps also suffer from an analogous disadvantageous color shifting that occurs with incandescent lamps with the dimming of the lamp output causing shifting of the light output toward the blue frequencies of the light spectrum. Additionally, the extent of the dimming is limited. That is to say, the range of the permitted dimming is limited. For instance, a high intensity discharge lamp is able to be dimmed down to 25-50% of its full output. But, unlike an incandescent lamp, the dimming cannot continue down to a zero output.

High intensity discharge lamps suffer from the further disadvantage of long lag times to re-illuminate, once the lamp output is extinguished. That is to say, once extinguished, a high intensity discharge lamp requires a significant amount of time to re-illuminate and return to a normal operating light output. This delay, for some lighting functions, particularly entertainment lighting functions, is unacceptably lengthy. A theatrical lighting fixture, for instance, must be able to illuminate precisely on cue, and with no acceptable delay.

Mechanical dimming devices are sometimes used to dim a light source. The disclosures of U.S. Pat. Nos. 1,146,143; 2,735,929; 3,433,142; 4,257,086; and 6,102,554 are all exemplary of mechanical devices available to dim light output. These exemplary disclosures, in general, provide for the fitting of a light source with a multi-leaf iris element. Arrangement of the iris element controls the light output. Use of iris mechanisms, or the like, suffer from various disadvantages. When positioned in proximity to a heat-generative, light source, the leaves of the iris elements expand. At areas of overlapping leaves of the iris element, the expansion sometimes results in jamming, i.e., movement of the leaves becomes constrained. And, when movement is constrained, dimming functionality is reduced. Complete blackout of illumination is sometimes not possible as a result of the jamming without the addition of extra leaves or ancillary mechanisms. Additionally, a multi-leaf iris element is relatively complex and also susceptible to damage.

Various other disclosures provide other mechanisms by which to perform light dimming. U.S. Pat. Nos. 1,330,766; 1,460,309; 1,550,600; and 6,769,777 provide disclosure of mechanisms that use controllably-rotatable flaps or luevers. Problems associated with jamming are common, in significant part, and their manufacture is simplified. However, these mechanisms require elements, at all times, to be positioned in the path of the light beam. And, as a result, the full output of a lighting fixture is not possible. While variants of the mechanisms allow flaps or luevers to be withdrawn from the light beam as well as to rotate, such mechanisms are generally prone to jamming and also permits light leakage around the slats or luevers.

U.S. Pat. Nos. 5,590,954; 5,724,625; and 6,241,366 disclose additional mechanical dimmers. These disclosures in general provide mechanisms that use one or more blades that are moved across a light beam to progressively obscure the light output. While these mechanisms are able completely to block light output and to allow all light output of the light source, such mechanisms are generally bulky and extend substantially outside the perimeter of the light beam, resulting in a lighting fixture that is of increased dimensional requirements.

Existing dimming mechanisms suffer from various disadvantages. If an improved dimming mechanism could be provided, improved functionality and performance would be possible.

It is in light of this background information related to light dimmers that the significant improvements of the present invention have evolved.

SUMMARY OF THE INVENTION

The present invention, accordingly, advantageously provides an apparatus, and an associated method, by which to control illumination. Through operation of an embodiment of the present invention, a manner is provided by which selectably, and controllably, to dim light output of a light source.

In one aspect of the present invention, a rectangular, or other, support frame is provided, the support frame defines a central aperture at which light output generated by a light source is directed. The frame is of dimensions, e.g., that is at least as large as diametral dimensions of the light output, i.e., light beam, that is generated by the light source. The frame is positionable, for instance, to be mounted at, and to form a portion of, a light fixture.

In another aspect of the present invention, the frame includes a pair of spaced-apart peripheral slats that are connected together by a pair of interconnecting slats. The peripheral and interconnecting slats together define the rectangular, or other-shaped, frame. The interconnecting slats include linear guides defined along side edge surfaces thereof.

In another aspect of the present invention, sets of contiguous blade numbers are supported at the peripheral slats of the frame. A first set of contiguous blade members is supported at a first of the peripheral slats. And, a second set of contiguous blade members is supported at a second of the peripheral slats. The blade members of the contiguous blade members are arranged side-by-side to abut, or partially overlap, one another. The blade members are, for instance, of elongated, rectangular shapes.

In another aspect of the present invention, the adjacent ones of the blade members are hingedly connected to one another, by way of the hinge connections. Accordion-like movement of the set of blade members is provided upon application of forces to the sets of blade members. Resultant translation of the sets of blade members along linear guides of the interconnecting slats causes the sets of blade members to wholly occlude the center aperture defined by the frame, to partially occlude the central aperture, or to occlude no portion of the central aperture.

In another aspect of the present invention, pivot shafts engage with at least selected blade members, e.g., alternating blade members, and extend into the linear guides formed along the edge surfaces of the interconnecting slats. The pivot shafts are positionable to move along the linear guides responsive to forces applied to one or more of the blade members. Movement forces receive are imparted to the hinge members that interconnect the adjacent blade members and the accordion-like movement of the blade members in directions along the linear guide responsive to components of the forces applied to the blade members.

In another aspect of the present invention, a rotary force transducer is further provided. The rotary force transducer operates to impart rotary forces upon a timing belt and pulley mechanism. The mechanism translates rotary forces into linear forces. The forces imparted to the blade members to cause their linear translation along the linear guides and the accordion-like movement of adjacent blade members When a decision is made to alter the level of dimming of light output generated by a light source, the rotary transducer is caused to generate rotary forces in a selected direction, clockwise or counter-clockwise. The rotary forces generated by the rotary force transducer are translated into linear forces and imparted to the sets of blade members, in causing their translation along the linear guides. When the rotary forces are in a first direction, the sets of blade members are caused to translate in a first direction, and when the rotary forces are in the other direction, the blade members are caused to translate in the other direction. Thereby, through appropriate application of rotary forces, the blade members are caused to be positioned in the central aperture, or out of the central aperture, to provide a desired amount of occlusion of light incident at the central aperture.

The resulting light dimmer is of relatively simple construction, of relatively compact dimensions. And, the entire range of dimming, from no dimming to complete occlusion is available through appropriate positioning of the blade members.

In these and other aspects, therefore, a light dimmer apparatus, and an associated method, is provided. A frame is formed of peripheral slats that together define a central aperture. A first set of contiguous blade members is supported at the frame. And, a hinge mechanism is configured to hingidly connect together adjacent ones of the contiguous blade members of the first set. The blade members are translatable responsive to rotation about the hinge mechanism to position the blade members at a selected amount of occlusion of the central aperture. Dimming of the light incident at the central aperture is dependent upon the position of the blade members.

A more complete appreciation of the scope of the present invention and the manner in which it achieves the above-noted and other improvements can be obtained by reference to the following detailed description of presently preferred embodiments taken in connection with the accompanying drawings that are briefly summarized below, and by reference to the appended claims.

DETAILED DESCRIPTION

Figure 1:
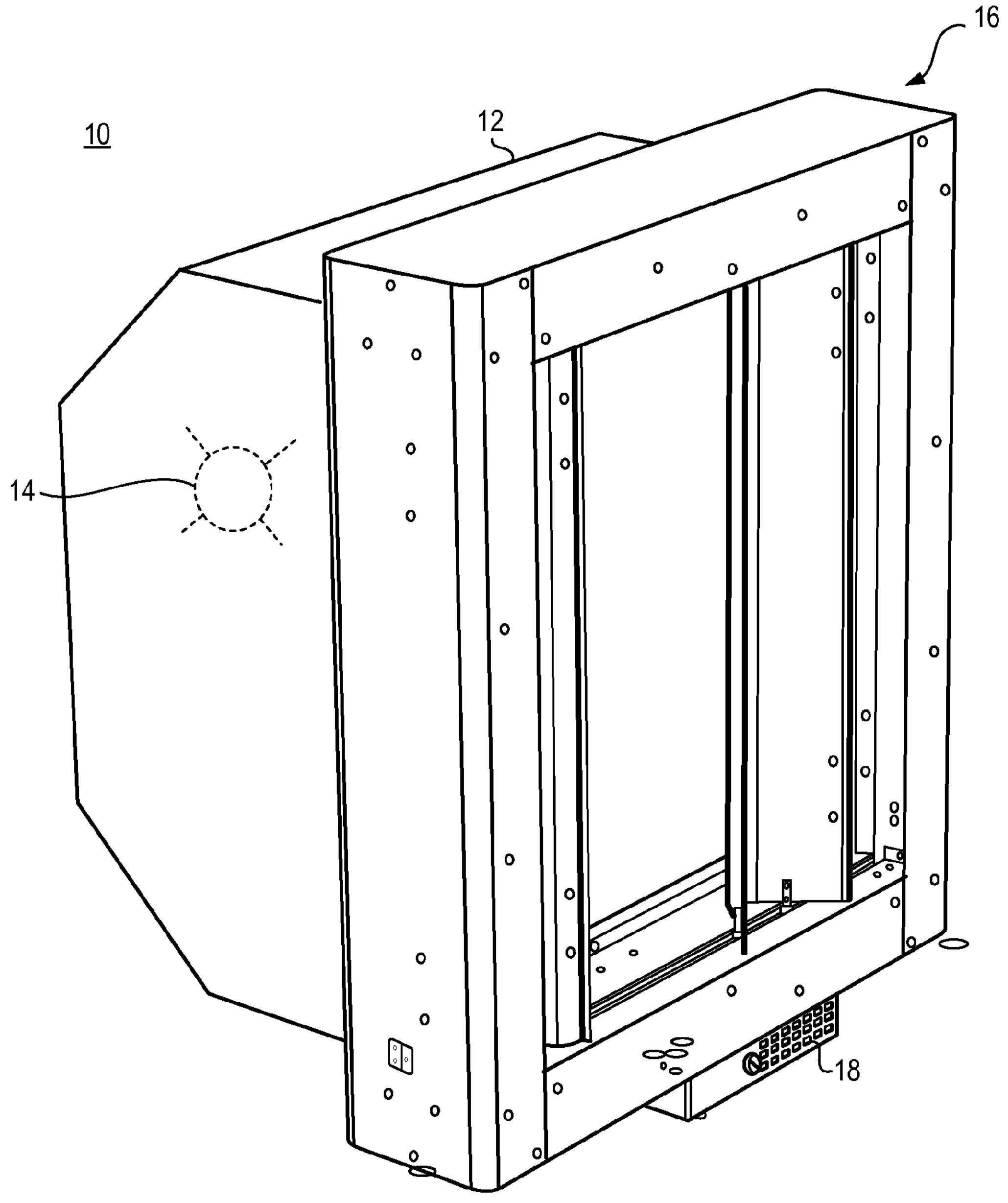
FIG. 1 illustrates a functional block diagram of a light fixture that includes the light dimming apparatus of an embodiment of the present invention.

Referring first to FIG. 1, an assembly, shown generally at 10, includes a light fixture 12 that supports a light source 14. The light source 14 generates a light beam forming a light output when the light fixture is provided with operative power. The light output generated by the light source 14 is incident at an apparatus 16 of an embodiment of the present invention. The apparatus 16 operates selectably to dim the light output of the light source that is incident at the apparatus 16. In the exemplary implementation, the apparatus 16 is supported at the light fixture by way of supportive, mounting connectors (not shown in FIG. 1). In other implementations, the apparatus 16 is supported in different manners and is utilized to dim light output generated by other types of light fixtures. While the following description shall describe exemplary operation with respect to the exemplary implementation in which the light fixture forms an entertainment lighting fixture, more generally, the assembly 10 is representative of any of various light-generative assemblies in which light energy is generated and selectably dimmed by the apparatus 16. A force imparting mechanism 18 is also shown.

Figure 2:
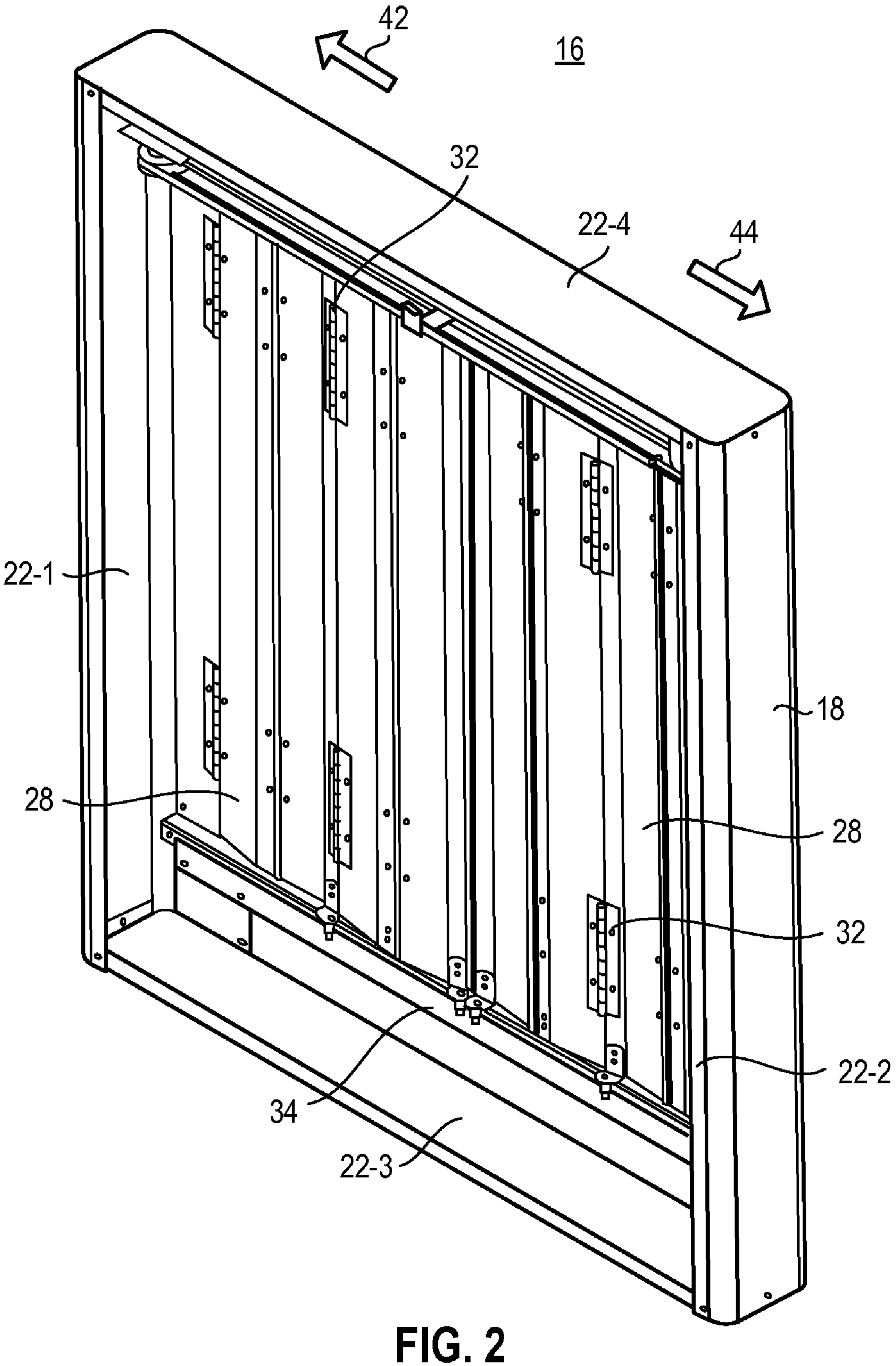
FIG. 2 illustrates a perspective view of the light dimmer apparatus of an embodiment of the present invention taken from a first angle.

FIG. 2 illustrates, the apparatus 16, shown in FIG. 1 to form part of the assembly 10, in greater detail. The apparatus includes a rectangular frame 18 formed of a plurality of peripheral slats 22. The peripheral slats, when connected together in the rectangular-frame configuration, define a central aperture 24. Opposing side slats 22-1 and 22-2 are referred to herein as peripheral slats, and the slats 22-3 and 22-4 are referred to herein as interconnecting slats that interconnect the peripheral slats. In the illustration of FIG. 2, the central aperture 24 is wholly occluded by a plurality of blade members 28. A first set of blade members 28 is supported by the peripheral support slats 22-1, and a second set of the peripheral slat members is supported by the second peripheral support slat 22-2. Each set of blade members includes a plurality of blade members positioned side-by-side with adjacent ones of the blade members connected together by hinge members 32.

The interconnecting slats 22-3 and 22-4 further define linear guides 34. The linear guides extend lengthwise along edge sides of the interconnecting slats. The linear guides, here configured as reverse rail members extending along the respective interconnecting slats. Pivot shafts 36 extending beyond selected ones, e.g. alternating ones, of the blade members 28 extend into the linear guides and are translatable with the blade members 28. Forces applied to the blade members cause accordion-like movement of the blade members and translation of the blade members along the linear guides 34. As shown in FIG. 2, the blade members are positioned to fully occlude the center aperture of the frame 18. Upon application of forces in appropriate directions, the sets of blade members are caused to be translated along the linear guides 34. Through appropriate application of the forces, the blade members partially occlude, or are positioned not to occlude the center aperture. In the exemplary implementation, rotational forces are applied to the pivot shafts, causing rotation of the pivot shafts and the blade members with which the pivot shafts are connected or otherwise associated. Hingedly-connected blade members, in turn, are also caused to be rotated. A component of the rotational force extends in the direction of the linear guide, facilitating translation of the blade members along the guide.

FIG. 3 again illustrates the apparatus 16 with the sets of blade members 28 configured in the closed position to occlude the passage of output light incident thereon. The frame is again shown to be formed of a pair of support slats 22-1 and 22-2 and a pair of interconnecting slats 22-3 and 22-4. The sets of blade members 28 wholly occlude the central aperture 24, and pivot shafts 36 extend into the lead guides 34 extending along the respective interconnecting slats. And, the hinge members 32 of a hinge mechanism are again shown to hingedly interconnect adjacent ones of the blade members 28 of the respective sets of blade members. When in the fully closed position, as illustrated, the light dimmer wholly occludes all of the light output that is incident thereon. Through appropriate application of forces to the sets of blade members, translation of the sets in the directions indicated by the arrows 42 and 44 cause repositioning of the blade members to occlude lesser portions of the light output that is incident thereon. The amount of occlusion is dependent upon the positioning of the blade members. By causing additional translation of the blade members to cause additional accordion-like movement thereof indicated by the arrows 42 and 44, greater amounts of light output is passed through the apparatus. And, conversely, translation of the sets of blade members in directions opposite to those of the arrows 42 and 44 increases the amount of occlusion and corresponding dimming of the light output that is incident at the central aperture.

FIG. 4 again illustrates the apparatus 16, herewith the sets of blade members 28 in fully retracted positions. When fully retracted, in the exemplary implementation, the blade members are wholly out of the central aperture 24 and do not occlude any of the light output that is incident at the central aperture. Through appropriate application of forces to, e.g., the pivot shafts, imparted forces cause translation of the blade members and rotation of the adjacent blade members about the hinges 24. In addition to the fully retracted position, as mentioned above, the sets of blade members are also positionable in partially retracted positions, partially to occlude the light output that is incident at the central aperture.

Figure 3:
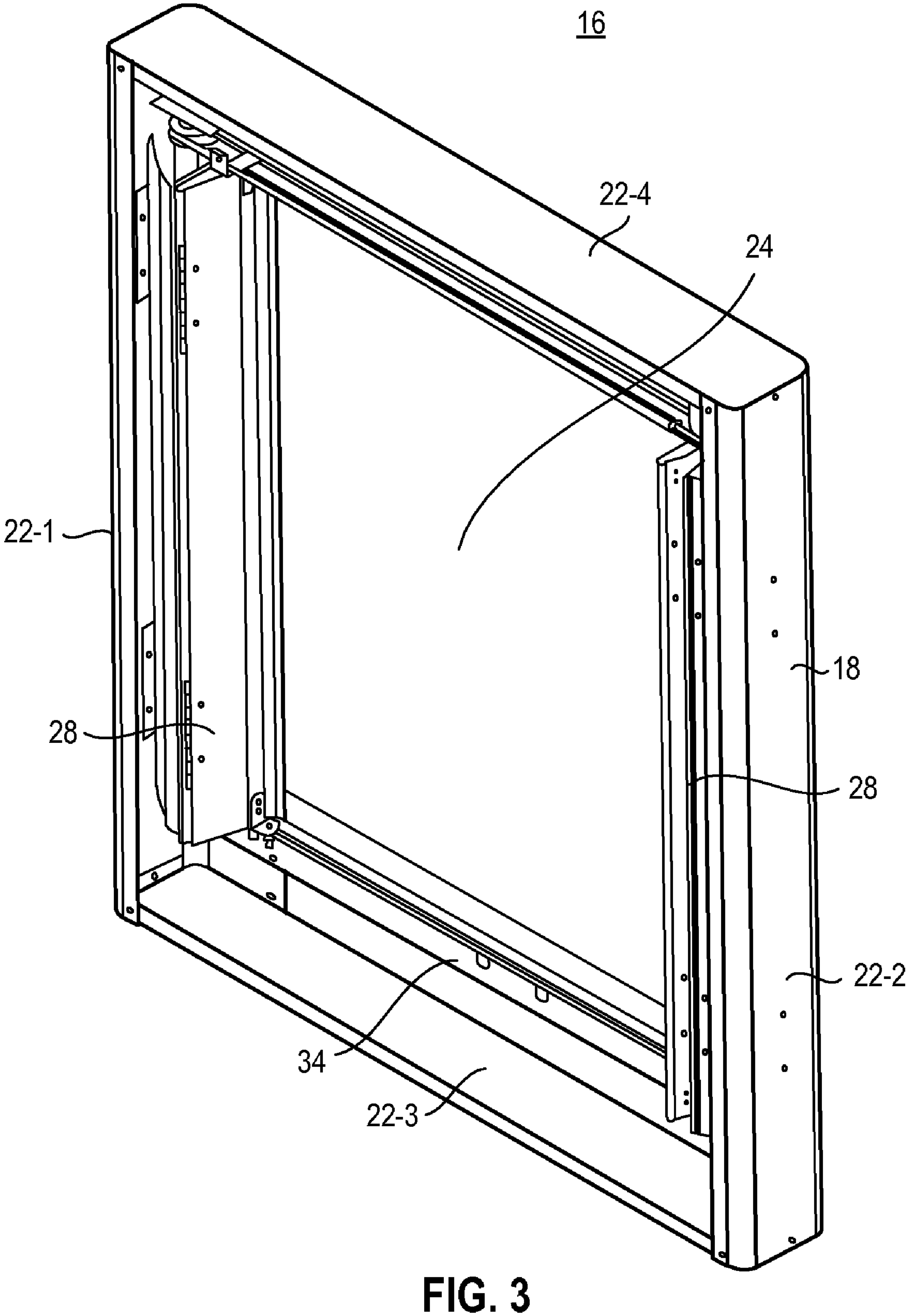
FIG. 3 illustrates a side-elevational view of the light dimming apparatus shown in FIG. 2.
Figure 4:
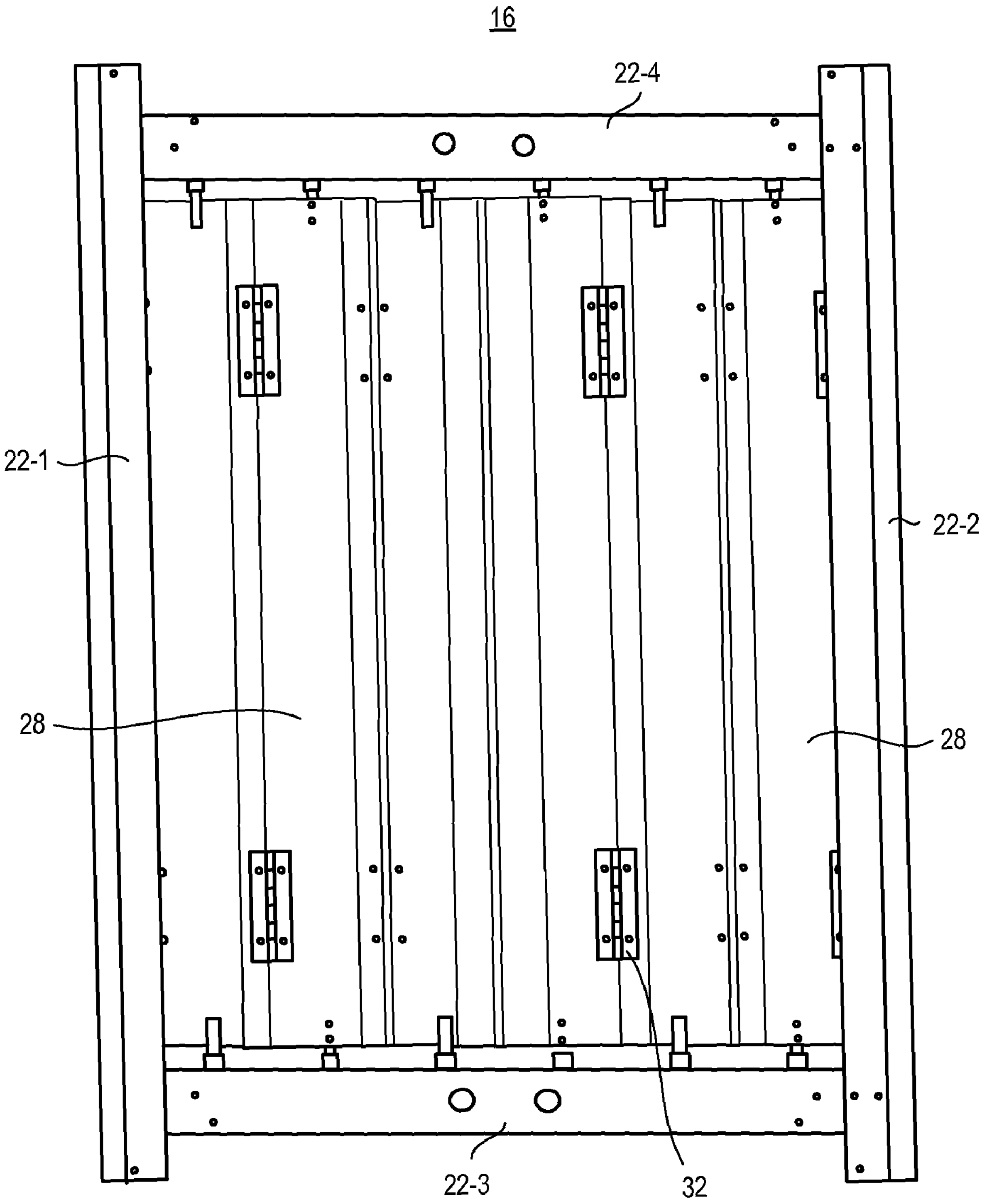
FIG. 4 illustrates a perspective view, similar to that shown in FIG. 2, but here with the blade members of the apparatus in a fully retracted position.
Figure 5:
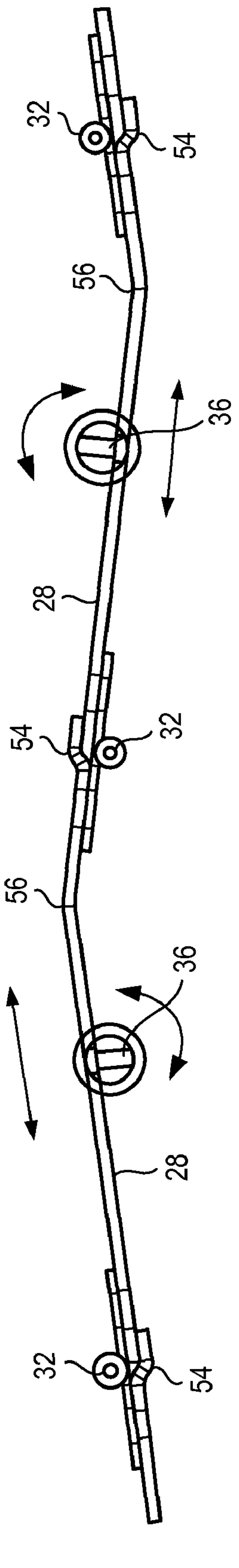
FIG. 5 illustrates a cutaway, overhead view of several blade members of the apparatus shown in FIG. 2-5.

FIG. 5 illustrates several blade members 28 of a set of blade members of the apparatus 26, shown in FIGS. 2-4. Hinges 28 are again shown to hingedly connect together blade members that are immediately adjacent to one another. The blade members include angled end portions 52 that overlap with adjacent blade members. That is to say, the blade members include bends 54. Formation of the blade members to include the angled end portions prevent the sets of blade members from forming a single plane when in the closed positions. Planar positioning might result in the sets of blade members to lock up, making the linear movements more difficult. Small angles of bends 54 ensures that linear movement, here indicated by the arrows 56, of the pivot shafts 36 and resultant rotation of the blade members more readily and easily achievable. The bends 54 here are of about 15 degrees. In an alternate implementation, the blade members are concave-shaped to provide the same result.

Figure 6:
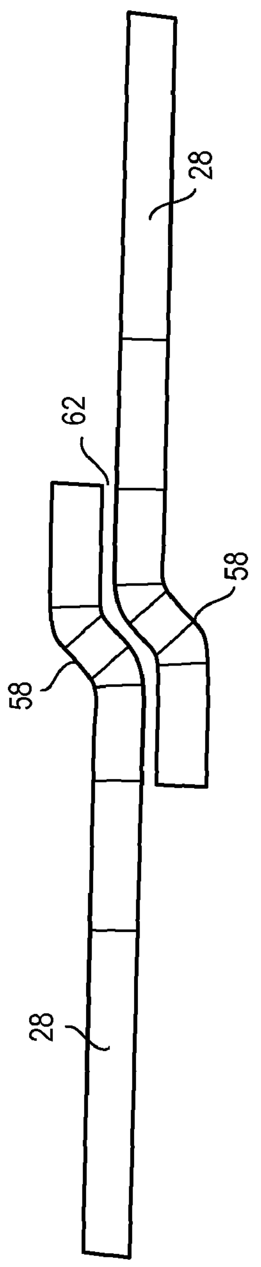
FIG. 6 illustrates an enlarged view of a portion of FIG. 5 illustrating overlapping portions of a pair of adjacent blade members of the apparatus shown in FIGS. 2-5.

FIG. 6 illustrates an enlarged view of overlapping parts of two blade numbers 28. Overlapping portions 58 are off set from one another to provide improved light-blocking effects. That is to say, through the overlapping and off setting, output light is fully blocked even when the adjacent blade numbers are separated by a gap, here the gap 62. This construction also permits increased tolerance in manufacture. Here, the offset forms a labyrinth gap that prevents the passage of light through the gap with a single reflection.

In the exemplary implementation, the blade members are opaque. In other implementations, the blade members are transparent, translucent, color, patterned, mirrored, textured, etc. Optical properties, as desired, are, in various implementations, provided, e.g., to cause the blade members to act as lenses or diffusers.

Figure 7:
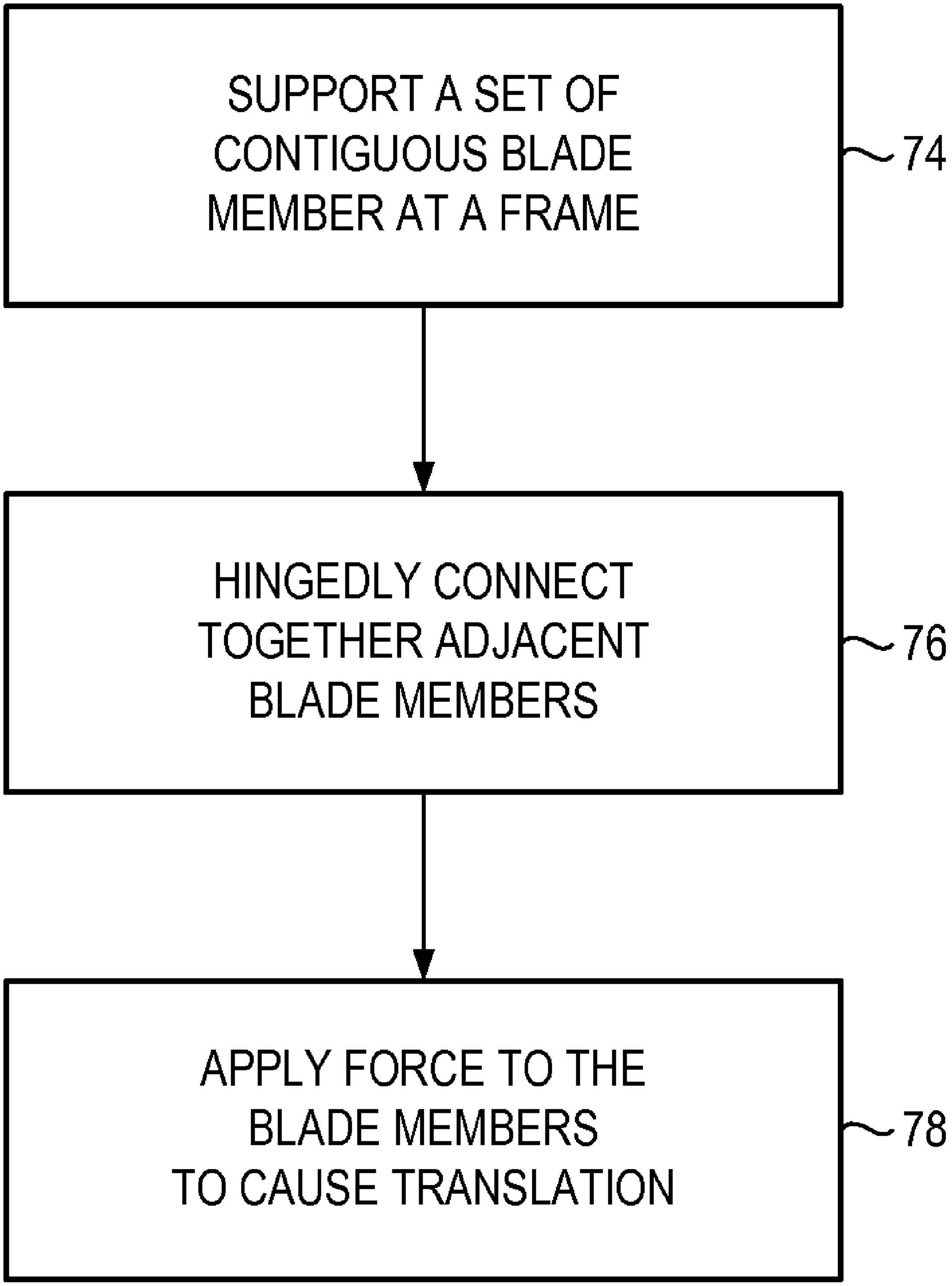
FIG. 7 illustrates a method flow diagram representative of the method of operation of an embodiment of the present invention.

FIG. 7 illustrates a method flow diagram, shown generally at 72, representative of the method of operation of an embodiment of the present invention. The method facilitates dimming of light generated by a light source.

First, and as indicated by the block 74, a first set of contiguous blade members is supported at a frame at which the light generated by the light source is incident. Then, and as indicated by the block 76, adjacent blade members are hingedly connected together. And, as indicated by the block 78, a force is applied to the blade members to cause translation of the blade members along the frame to cause a selected amount of dimming of light incident at the frame.

Thereby, manner is provided that provides for dimming of light output that is generated by a light source.

A compact dimmer is provided, of relatively non-complex construction to permit repeated operation with reduced possibility of jamming or other malfunction.

Presently preferred embodiments of the invention and many of its improvements and advantages have been described with a degree of particularity. The description is a preferred example of implementing the invention and the description of the preferred examples is not necessarily intended to limit the scope of the invention. The scope of the invention is defined by the following claims:

The invention claimed is:

1. A light dimmer apparatus for dimming incident light, said light dimmer apparatus comprising:

a frame formed of peripheral slats that together define a central aperture a first set of contiguous blade members supported at said frame, each blade member of the first set hingedly connected to each blade member contiguous thereto, each using a hinge to hingedly connect to each adjacent blade member; and a force-imparting mechanism configured to impart movement to adjacent ones of the contiguous blade members of said first set, the blade members translatable responsive to forces imparted by said force-imparting mechanism to position the blade members at a selected amount of occlusion of the central aperture between no occlusion of any part of the central aperture and full occlusion of all the central aperture, dimming of light incident at the central aperture dependent upon the position of the blade members.

2. The light dimmer apparatus of claim 1 wherein the peripheral slats forming said frame comprise a pair of opposing peripheral slats.

3. The light dimmer apparatus of claim 2 wherein the peripheral slats further comprise an interconnecting slat, and wherein the opposing peripheral slats are configured to be interconnected by the interconnecting slat.

4. The light dimmer apparatus of claim 3 wherein the interconnecting slat further defines an inverted rail extending therealong, the blade members of said first set engaged at the inverted rail, translatable therealong responsive to forces imparted by blade members imparted by said force-imparting mechanism.

5. The light dimmer apparatus of claim 2 further comprising a second set of contiguous blade members supported at said frame.

6. The light dimmer apparatus of claim 5 wherein said first set of contiguous blade members is supported at a first peripheral slat of the pair of opposing peripheral slats, and wherein said second set of contiguous blade members is supported at a second peripheral slat of the pair of opposing peripheral slats.

7. The light dimmer apparatus of claim 1 wherein said force-imparting mechanism further comprises rotary transducer that generates a rotary force translatable into a linear force.

8. The light dimmer apparatus of claim 1 wherein the blade members of said first set are configured to be of non planar configurations.

9. The light dimmer apparatus of claim 8 wherein the blade members of said first set comprise angled end parts.

10. The light dimmer apparatus of claim 8 wherein adjacent blade members of said first set partially overlap.

11. The light dimmer apparatus of claim 1 further comprising a translator configured to apply rotation forces to said rotation mechanism, a component part of which causes translation of the blade members.

12. The light dimmer apparatus of claim 1 wherein said first set of blade members are configured to dim light incident at the central aperture when the blade members are positioned to occlude at least part of the central aperture.

13. A method for dimming incident light generated by a light source, said method comprising:

supporting a first set of contiguous blade members at a frame at which the light generated by the light source is incident; and hingedly connecting together each of the blade members of the first set supported at the frame to each blade member continuous thereto, each using a hinge to hingedly connect to each adjacent blade member; and applying a force to the first set of blade members to cause hinged rotation of the blade members and translation thereof along the frame to cause a selected amount of dimming of light incident at the frame between no occlusion of any part of a central aperture defined by the frame and full occlusion of all of the central aperture.

14. The method of claim 13 wherein the frame defines the central aperture and wherein said applying the force comprises applying a force to the first set to cause a selected amount of occlusion of the central aperture.

15. The method of claim 13 wherein said supporting further comprises supporting a second set of contiguous blade members at the frame.

16. The method of claim 15 wherein said hingedly connecting further comprises hingedly connecting together adjacent blade members of the second set supported at the frame.

17. The method of claim 16 wherein said applying the force further comprises applying a force to the second set of blade members to cause hinged rotation of the blade members of the second set and translation thereof along the frame to cause a selected amount of dimming of the light incident at the frame.

18. The method of claim 17 wherein said applying the force comprises concurrently applying the force to the first set and to the second set.

19. The method of claim 13 wherein the frame further comprises a linear guide and wherein said supporting comprises supporting the first set of contiguous blade members at the linear guide.

20. The method of claim 19 wherein said applying the force comprises applying the force to cause translation of the blade members along the linear guide.

* * * * *